United States Patent
Jess et al.

Patent Number: 5,809,915
Date of Patent: Sep. 22, 1998

[54] CONTOURING DRY LAND SEED DRILL

[75] Inventors: James L. Jess; Kevin Prather, both of Coulee City, Wash.

[73] Assignee: JK Industries, LLC, Coulee City, Wash.

[21] Appl. No.: 664,682

[22] Filed: Jun. 17, 1996

[51] Int. Cl.$^6$ .................................................. A01C 5/06
[52] U.S. Cl. ........................... 111/69; 111/136; 111/151; 111/155; 111/195; 172/142; 172/175; 172/195; 172/643; 172/657; 172/734; 172/748
[58] Field of Search .................................. 111/151, 155, 111/154, 195, 136, 69, 73; 172/142, 169, 175, 195, 643, 657, 684, 748, 734

[56] References Cited

U.S. PATENT DOCUMENTS

| | | | |
|---|---|---|---|
| 2,445,698 | 7/1948 | Siebring | 111/154 X |
| 2,804,034 | 8/1957 | Hunter | 111/155 |
| 3,140,678 | 7/1964 | Morris | 111/154 X |
| 4,208,974 | 6/1980 | Dreyer et al. | 111/195 X |
| 4,265,185 | 5/1981 | Skipper | 111/73 X |
| 4,311,104 | 1/1982 | Steilen et al. | 111/154 X |
| 4,417,530 | 11/1983 | Kopecky | 111/73 |
| 4,691,645 | 9/1987 | Anderson | 111/155 |
| 4,750,441 | 6/1988 | Pfenninger et al. | 111/154 X |
| 4,844,174 | 7/1989 | Zimmerman | 111/195 X |
| 4,860,672 | 8/1989 | Zimmerman | 111/151 X |
| 5,394,946 | 3/1995 | Clifton et al. | 111/73 X |
| 5,396,851 | 3/1995 | Beaujot | 111/73 X |

FOREIGN PATENT DOCUMENTS

| | | | |
|---|---|---|---|
| 2236402 | 1/1975 | France | 111/154 |
| 1399981 | 7/1975 | United Kingdom | 111/155 |
| 2043419 | 10/1980 | United Kingdom | 111/155 |

*Primary Examiner*—Michael J. Carone
*Assistant Examiner*—Christopher J. Novosad
*Attorney, Agent, or Firm*—Graybeal Jackson Haley LLP

[57] ABSTRACT

A seed drill particularly adapted for contouring uneven ground and accommodating rocks, especially where depth of furrow and placement of seed against wet soil is critical, as in dry land farming. Each drill in a set of drills is a separate unit which is mounted on a vehicle. Each unit includes a split press wheel with an opener mounted within the wheel. The units can easily be individually mounted or adjusted on the vehicle for spacing and height. The opener has an articulating adjusting arm which allows easy adjustment to all preferred positions.

11 Claims, 4 Drawing Sheets

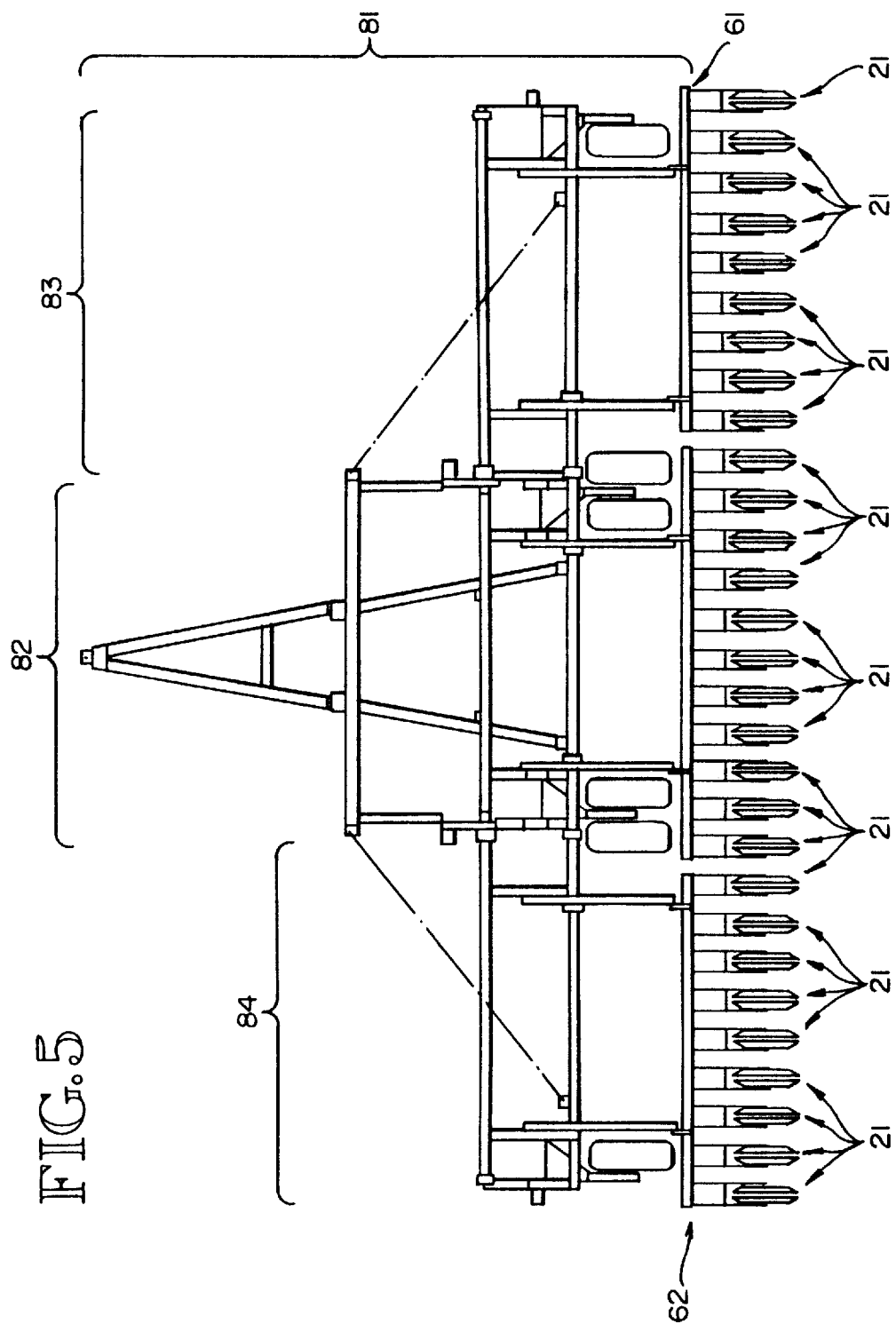

CONTOURING DRY LAND SEED DRILL

BACKGROUND

In dry land farming, seeds are often planted when the top few inches of soil are dry. Using an opener which penetrates through the dry soil down to the wet soil, a mechanical seed drill places a seed against the wet soil. A press wheel presses the soil into a suitable furrow shape to displace dry dirt on the surface, for protection of the seed, water and encouraging the seed to grow. The most effective currently manufactured seed drills, such as the John Deere 9400, include many hoe openers mounted on a trailer vehicle followed by a set of press wheels mounted on the same vehicle. A separate vehicle which precedes or follows carries the seed tank and an air delivery system for feeding seeds via tubes to each opener. Although the spacing of hoes and press wheels can be preset to any desired spacing, after the set of drills is manufactured it is very difficult to change the spacing.

If the land is not flat or contains rocks, the John Deere 9400 performs poorly because the hoes sometimes dig too deep, sometimes not deep enough. When turning a corner or when the grain drill slips sideways due to gravity on a side hill or due to rocks in the terrain, the press wheels do not follow correctly behind the hoes. For these conditions, the 30-year old John Deere HZ Grain Drill is still the best. It includes a hoe opener mounted within the press wheel, which is split to accommodate the opener. By this means, the relationship between the opener and the press wheel is constantly maintained. In the HZ, about eight opener and press wheel combinations are ganged together with a single axle in a unit containing a grain box on top. Each unit is towed, typically alongside three or four additional units. The spacing between opener and press wheel combinations is not adjustable. Each opener is mounted on a trailing arm. The connection of the opener to the arm is adjustable with a pivot and a cotter pin which can be placed in any of many holes. The cotter pin acts as a shear pin when the opener hits a rock to minimize damage to the opener and the trailing arm.

SUMMARY

The invention is an improved set of grain drills particularly suited for dry land farming where the land is not flat or includes rocks. Each drill in the set of drills is highly adjustable so that the same set of drills can be used for varying conditions, including spring planting in moist soil. Each combination of opener and split press wheel is mounted on a separately pivotable spring-loaded trailing arm. This way, each opener and press wheel assembly can follow the contour of the land where it is passing without affecting the adjustment of the opener and press wheel assemblies beside it. Also, each opener is mounted with a pivot and a spring so that when it strikes a rock it can pivot upwardly against the spring and then promptly return to the preferred position without breakage of any part.

Each opener and press wheel assembly is pivotably attached to a mounting base and urged by a spring downward into the soil. The spring force by which the drill is pressed against the ground, and the force in turn transmitted to the mounting base which transmits it to the vehicle, is adjustable by adjusting the location of a collar which retains the spring in relation to the mounting base.

The mounting base includes a plurality of holes for adjusting vertically its attachment to a vehicle. Because each drill is a separate unit with one mounting base for both the hoe drill and the press wheel, they can be easily mounted to the vehicle with any spacing between them and the spacing can be easily adjusted by changing the point of attachment to the vehicle. When the spacing between drills is adjusted, the operation is greatly simplified because the opener and press wheel assembly remain attached to each other and are moved as a unit along the mounting rail at the back of the vehicle.

To ensure that the seed is placed in precisely the correct location at the bottom of the furrow and covered by the preferred amount of soil by the press wheel, the opener is to be placed deep within the split in the press wheel. However, because the opener is mounted on a spring to accommodate rocks, a certain clearance must be maintained between the back of the opener and the press wheel axle. Differing soil and planting conditions will require a different vertical adjustment of the opener point compared to the press wheel. When the opener point is adjusted at its highest position, and far enough forward of the press wheel axle to maintain adequate clearance, this position is not directly above the preferred lowest position for adjustment of the opener. Rather, when the opener is adjusted downward, it must also be adjusted backward to maintain the preferred relationship with the press wheel. As the opener is adjusted downward, it has greater clearance with the press wheel axle, allowing the opener to be moved backward as it is adjusted downward while still maintaining adequate clearance between the back of the boot and the press wheel axle for spring action to accommodate rocks. To achieve this preferred adjustment path of moving forward as it is moved upward and moving backward as it is moved downward, the opener shank is pivotably mounted on an adjusting arm which pivots upon a support base wherein the support base pivot is located behind and above the pivot point between the opener and the adjusting arm. Consequently, when the adjusting arm pivots about its support base pivot, the pivot which attaches the opener to the adjusting arm moves forward as it moves upward, and moves backward as it moves downward. Each of these two pivots is held to a preferred angle by an adjustable link, preferably a turnbuckle.

Because each of the pivots has a separately adjustable link, the horizontal angle between the opener and the earth can be maintained as the opener is adjusted upward (and forward) or downward (and backward). Alternatively, if the farmer wishes to modify the horizontal angle between the opener and the earth, this can likewise be done to easily achieve whatever angle to the earth the farmer believes is preferred.

BRIEF DESCRIPTION OF THE DRAWINGS

FIG. 3 shows a top view of the mounting base and the spring supports.

FIG. 5 shows a top view of a vehicle with a typical number of press wheel assemblies attached to its back edge.

DETAILED DESCRIPTION

Figure 1:
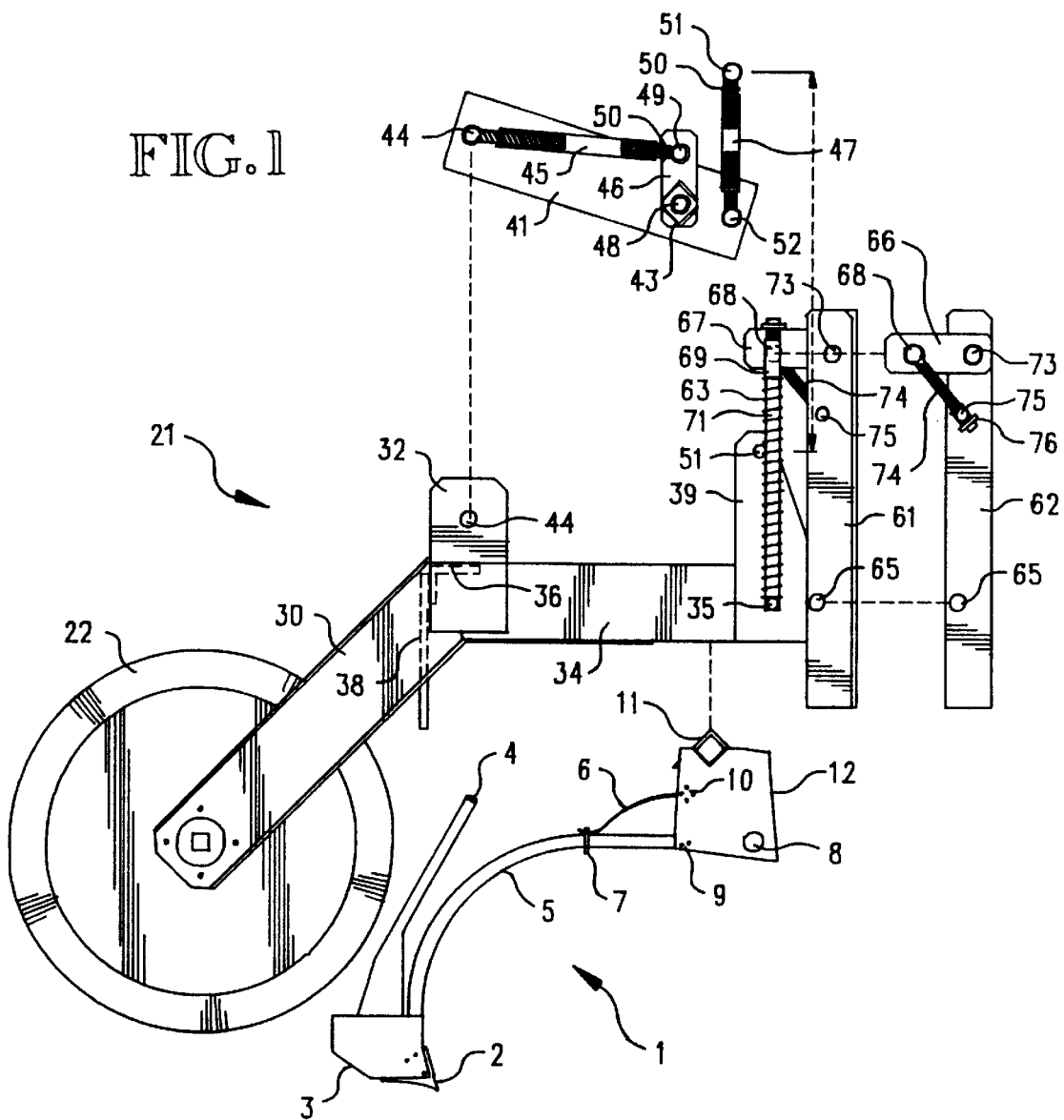
FIG. 1 shows a side view of all of the components.
Figure 2:
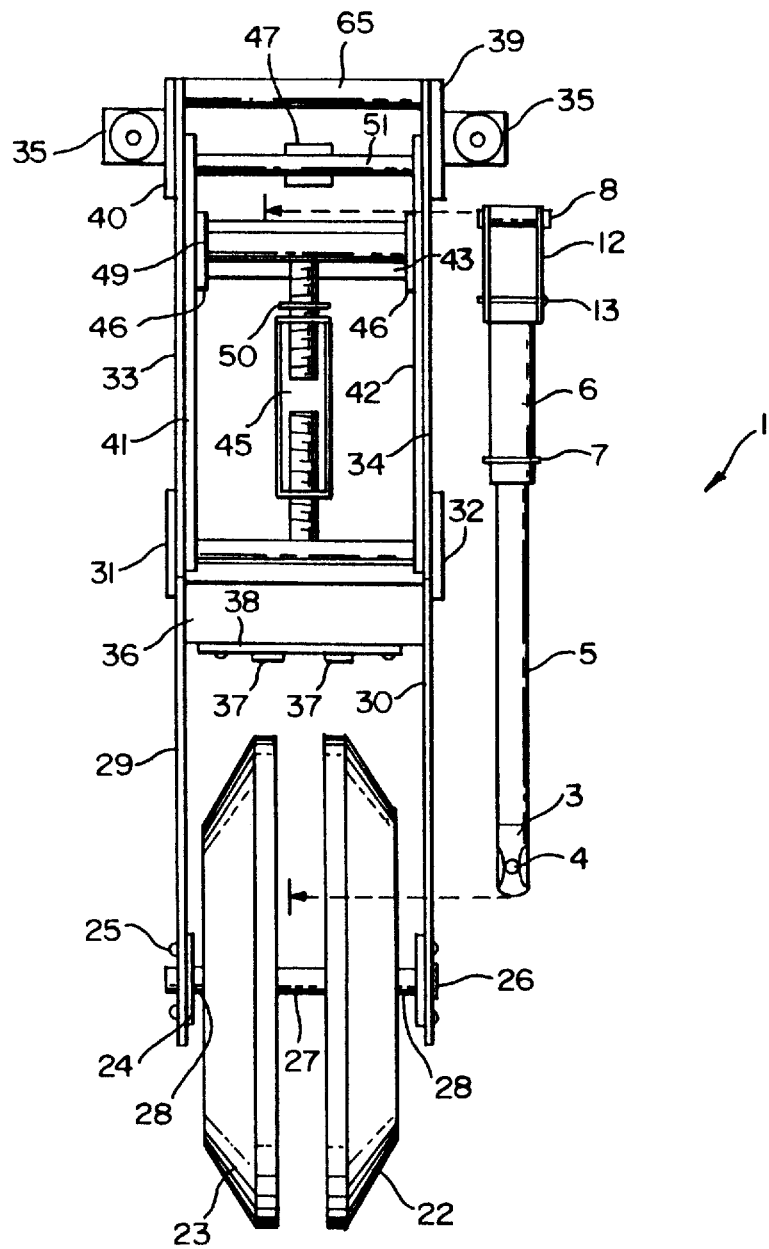
FIG. 2 shows a top view of the press wheel support arms and press wheel and the adjusting arm. It does not include the mounting base or the opener assembly.

Parts List:
1. opener assembly
2. opener point
3. opener boot
4. opener seed tube
5. opener shank
6. opener spring
7. opener spring clip
8. opener pivot shaft
9. opener shank support pin holes 10. opener spring adjustment pin holes
11. opener attachment clamp
12. opener frame
13. spring force pin
21. opener and press wheel assembly
22. right press wheel
23. left press wheel
24. ball bearing
25. bearing bolt
26. press wheel axle
27. central spacer
28. lateral spacer
29. left lower press wheel arm
30. right lower press wheel arm
31. left arm support bracket (& weld patch
32. right arm support bracket (& weld patch)
33. left upper press wheel arm
34. right upper press wheel arm
35. spring force receiving shelves
36. L cross brace
37. shank guides
38. shank guide base
39. right adjusting arm turnbuckle support
40. left adjusting arm turnbuckle support
41. left adjusting arm
42. right adjusting arm
43. square opener support shaft
44. adjusting arm support shaft
45. opener turnbuckle
46. opener adjuster levers
47. adjusting arm turnbuckle
48. round opener support shaft
49. adjuster lever shaft
50. turnbuckle lock nut
51. adjusting arm turnbuckle support shaft
52. adjusting arm turnbuckle connecting shaft
61. right mounting base
62. left mounting base
63. right spring
64. left spring (not shown)
65. opener and press wheel assembly support shaft
66. left spring force adjusting lever
67. right spring force adjusting lever
68. spring support shaft
69. right spring support collar
70. left spring support collar
71. right spring shaft
72. left spring shaft (not shown)
73. spring adjusting lever support shaft
74. spring force adjusting rod
75. adjusting rod retaining shaft
76. adjusting nut
81. vehicle
82. central portion of vehicle
83. right articulating arm
84. left articulating arm FIG. 1 shows a side view of all components. The opener assembly 1 is comprised of a narrow hoe point 2 and a narrow boot 3 attached to the trailing end of a steel shank 5 and a seed tube 4 attached to the boot. The shank 5 is attached to a pivot shaft 8 which is mounted inside a frame 12. Also inside the frame a spring 6 is attached to the pivot shaft 8 and held to the shank 5 with a spring clip 7. The spring is urged against the shank 5 and pivot 8 by a spring force pin 13 (shown in FIG. 2 but not FIG. 1) inserted in one of the adjustment pin holes 10. The position of the shank 5 is adjusted with a similar pin inserted in one of the shank support pin holes 9. The top edge of the frame 12 is cut with a square shape, and an attachment clamp 11 completes the square shape.

The resilience of the shank 5 and the springiness of the spring 6 which allows the point 2 to rotate about the pivot shaft 8 when the point 2 strikes rocks prevents bending or breakage.

The frame 12 and clamp 11 clamp to the square opener support shaft 43 which is welded at both ends to an opener adjuster levers 46. Inside the square opener support shaft 43 is a round support shaft 48 which passes through the left adjusting arm 41 and right adjusting arm 42 to support the square shaft and adjuster levers.

The adjuster levers 46 are acted upon by the adjuster lever shaft 49, which is acted upon by the opener turnbuckle 45, which is mounted at its opposite end to the adjusting arm support shaft 44. The adjusting arm support shaft 44 also serves a second function of supporting the adjusting arm by passing through the left arm support bracket 31 and the right arm support bracket 32.

The left and right arm support brackets are welded to the left upper press wheel arm 33 and the right upper press wheel arm 34 at the point where they are welded to the left lower press wheel arm 29 and the right lower press wheel arm 30, providing additional strength for that weld joint. At the same weld joint, the L cross brace 36 connects the right press wheel arm with the left press wheel arm. Attached to the L cross brace with bolts is a shank guide base 38 to which the two shank guides 37 are welded to support the shank against sideways deflection when the shank is in operating position.

For adjusting the vertical angle of the left and right adjusting arms 41 & 42, a turnbuckle connecting shaft 52 is attached to the moving end of the arm and is acted upon by the adjusting arm turnbuckle 47, which is supported by the adjusting arm turnbuckle support shaft 51, which in turn is supported by the left adjusting arm turnbuckle support 40 and the right adjusting arm turnbuckle support 39. These adjusting arm turnbuckle supports are welded to the right upper press wheel arm 34 and left upper press wheel arm 33.

Both of the turnbuckles 45 & 47 have lock nuts 50. The turnbuckles are preferably manufactured of square tube welded to a left threaded nut at one end and a right threaded nut at the other. The square tube can be turned with an open-end wrench. The rigidity of the turnbuckles maintains a constant relationship between the opener assembly 1 and the split press wheel 22 & 23 mounted on the ends of the press wheel arms.

Attached to the left and right lower press wheel arms 29 & 30 are ball bearings 24 attached to the arms with bolts 25. The press wheel axle 26 passes between each of the bearings and supports the left press wheel 23 and right press wheel 22 which are retained horizontally by a central space 27 and lateral spacers 28. The axle is a bolt with a head and a nut. The split press wheel 22 & 23 is a common prior art design like the press wheel in the John Deere HZ Grain Drill.

Looking at FIG. 1, one can see that adjusting the adjusting arm turnbuckle 47 causes the opener assembly 1 to rotate about the adjusting arm support shaft 44. Adjusting the opener turnbuckle 45 causes the opener assembly 1 to rotate about the opener support shafts 43 & 48. By adjusting the two turnbuckles together, the vertical angle of the opener point 2 and boot 3 to the earth can be maintained while the opener is adjusted up and down. If the horizontal angle of the opener to the earth is maintained constant while adjusting, raising the adjusting arm 41 & 42 causes the opener assembly to move forward as it is raised, which maintains adequate clearance between the boot 3 and the press wheel axle 26, maintaining the point 2 at the preferred location with respect to the split press wheel 22 & 23 at each point of adjustment.

The opener and press wheel assembly 21 includes an opener and press wheel assembly support shaft 65 at its leading end. The support shaft 65 passes through a hole in a right mounting base 61 and a left mounting base 62. Spring force for urging the split press wheel and opener against the earth is applied via the spring force receiving shelves 35 via a right spring 63 and a left spring (not shown). The springs are acted upon by a right spring support collar 69 and a left spring support collar 70, which are welded to the ends of the spring support shaft 68. The spring support shaft is adjusted vertically by moving the left spring force adjusting lever 66 and the right spring force adjusting lever 67. The adjusting levers are pulled against the springs by the spring force adjusting rod 74, which is welded to the spring support shaft 68 and passes through a hole in the center of the adjusting rod retaining shaft 75. The adjusting nut 76 pulls on the adjusting rod retaining shaft 75, which in turn passes through the left mounting base 62 and the right mounting base 61.

So that the shafts do not work themselves out sideways, each of the various shafts is welded to one or more of the various pieces through which it passes, or washers are welded to the shaft to prevent it from migrating. Instead of a shaft which passes all the way through the unit, the spring force receiving shelves 35 are welded or bolted to the press wheel support arms 33 & 34 and the adjusting arm turnbuckle supports 39 & 40, and the central portion of the shaft is eliminated to create greater clearance for the adjusting arm. Similarly, the spring adjusting lever support shaft 73 need not pass all the way through. Because the shear forces are low, it can be replaced with a nut and bolt loosely attaching the left lever to the left mounting base and a nut and bolt loosely attaching the right lever to the right mounting base.

Figure 4:
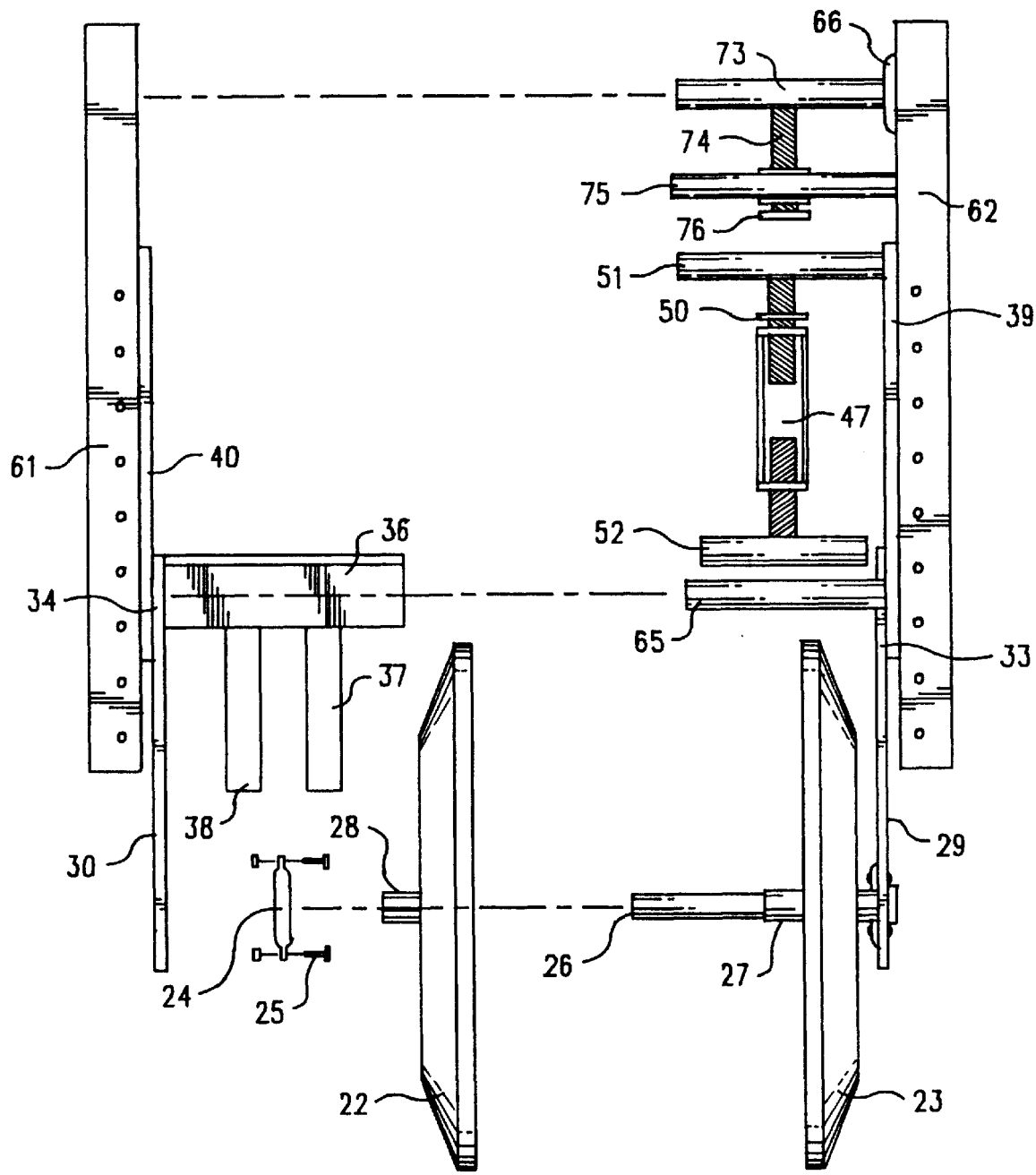
FIG. 4 shows a front view of the mounting base and spring supports, as well as the adjustable link which holds the adjusting arm at a preferred angle, the press wheel, and guides which support the shank against deflection.

As shown in FIG. 4, the mounting bases 61 & 62 include numerous holes for adjustably mounting the base to a vehicle 81, which then pulls a set of seed drill assemblies. A plurality of seed drill assemblies are mounted via their mounting bases side by side on a trailing mounting bracket on the back of any of many different kinds of vehicles. Preferably, for operating a large number of seed drills at the same time, a set of seed drills is mounted on a central portion 82 of the vehicle, an additional set of seed drills is mounted on an articulating arm 83 which extends the central section but pivots vertically, and another set of seed drills is mounted on a second articulating arm 84 which extends the central section in the opposite direction and pivots vertically. Alternatively, sets of seed drills may be mounted on each of a set of towed vehicles, which are towed side by side or in a staggered arrangement.

In front of or behind the drill vehicles is a seed tank with a conventional air-driven supply system distributing seeds via seed tubes to each opener seed tube 4 on each seed drill. Alternatively, the seed tank and air delivery system may be mounted on the vehicle which pulls the sets of seed drills.

Each mounting base can be vertically adjusted as it is mounted on a vehicle. More importantly, the spacing between seed drills can be adjusted as the mounting bases are attached to the vehicle to allow for preferred spacing based on type of soil, climate, and crop. Also, to improve flow-through clearance of stubble, the mounting structure on the vehicle can be set up to allow staggering of the drills; one forward, the next back, the next forward, the next back, etc. Because the hoe and press wheel always maintain the preferred relationship to each other, this staggering will not adversely affect the uniformity of the planting.

Although the preferred form of the invention is described above, along with some variations, many other variations are possible for the invention. The scope of the invention should not be limited by the above description. It is specified in the following claims.

We claim:

1. A set of seed drills, the set having a forward direction and a rearward direction comprising a plurality of opener and press wheel assemblies which move vertically independently of each other, each opener and press wheel assembly comprising:

(a) a single split press wheel, having two halves, one half on each side of a plane of symmetry, rotatably mounted on a trailing arm via an axle which is fixed to the trailing arm, (b) a single opener attached to the trailing arm and located forward of the axle and centered on the plane of symmetry of the press wheel, and (c) the trailing arm vertically pivotally attached to a vehicle mounting base.

2. The set of seed drills of claim 1 wherein each opener has a point and a boot and the boot is positioned between the halves of the split press wheel.

3. The set of seed drills of claim 1 wherein each opener is mounted with a spring which allows vertical and rearward movement against the force of the spring.

4. The set of seed drills of claim 1 wherein each opener is mounted on a shank which is vertically adjustable relative to the press wheel.

5. The set of seed drills of claim 1 wherein each vehicle mounting base includes adjustable mounting hardware for adjustably attaching the mounting base to a vehicle.

6. The set of seed drills of claim 1 wherein said opener and press wheel assemblies are mounted on a vehicle which is self supported such that said trailing arm of each assembly, being pivotally attached to said mounting base, does not transmit additional weight placed on said vehicle to said press wheels mounted on said trailing arms.

7. The set of seed drills of claim 6 wherein said vehicle has a front and a back and said opener and press wheel assemblies are mounted on the back of said vehicle.

8. A vehicle, having a back and a front, with a plurality of seed drill assemblies which move vertically independently of each other mounted at the back, each seed drill assembly comprising a single opener mounted on a trailing arm and, following said opener, a press wheel also mounted on said trailing arm such that said opener and said press wheel move vertically together such that a mound of earth which causes said press wheel to rise will also cause said opener to rise an approximately equal amount.

9. The vehicle with seed drill assemblies of claim 8 wherein the press wheels are split press wheels, each opener has a point and a boot, and the boot of each opener is positioned between the two halves of its following split press wheel.

10. The vehicle with seed drill assemblies of claim 8 wherein each seed drill assembly is urged downward by a spring which pushes against the vehicle.

11. The vehicle with seed drill assemblies of claim 8 wherein each seed drill assembly is adjustably mounted to the vehicle such that the horizontal spacing between seed drill assemblies can be adjusted.

* * * * *